(12) United States Patent
Wang

(10) Patent No.: US 11,206,156 B2
(45) Date of Patent: Dec. 21, 2021

(54) METHOD AND APPARATUS FOR STORING DATA OF TRANSMISSION SIGNAL, AND COMPUTER READABLE STORAGE MEDIUM

(71) Applicants: HKC Corporation Limited, Guangdong (CN); Chongqing HKC Optoelectronics Technology Co., Ltd., Chongqing (CN)

(72) Inventor: Mingliang Wang, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 17/033,920

(22) Filed: Sep. 27, 2020

(65) Prior Publication Data

US 2021/0014086 A1    Jan. 14, 2021

Related U.S. Application Data

(63) Continuation of application No. PCT/CN2018/116932, filed on Nov. 22, 2018.

(30) Foreign Application Priority Data

Oct. 8, 2018  (CN) .......................... 201811171298.7

(51) Int. Cl.
    *H04L 25/02*    (2006.01)
(52) U.S. Cl.
    CPC ........ *H04L 25/0272* (2013.01); *H04L 25/028* (2013.01); *H04L 25/0292* (2013.01)

(58) Field of Classification Search
CPC ... H04L 27/1563; H04L 25/0292; H04L 7/00; H04L 27/14; H04L 25/028; H04L 7/0008;
(Continued)

(56) References Cited

U.S. PATENT DOCUMENTS 5,867,541 A * 2/1999 Tanaka ................. H04L 7/0337
                                                       375/354
9,673,962 B1    6/2017 Khan et al.
(Continued)

FOREIGN PATENT DOCUMENTS

| CN | 101202614 A | 6/2008 |
|----|-------------|--------|
| CN | 101606365 A | 12/2009 |

(Continued)

OTHER PUBLICATIONS

International Search Report of PCT Patent Application No. PCT/CN2018/116932 dated Jul. 9, 2019.

*Primary Examiner* — Sophia Vlahos

(57) ABSTRACT

The present application discloses a method for storing data of a transmission signal, which includes: upon the reception of the transmission signal, analyzing a clock signal corresponding to the transmission signal to obtain a signal frequency of the clock signal; according to the signal frequency, acquiring zero-volt time points of a clock signal after signal superposition with the transmission signal; acquiring a preset time length, and according to the zero-volt time points and the preset time length, generating data storage time periods with each of the zero-volt time points as a central time point; and storing data of the transmission signal within each of the data storage time periods. The present application further provides an apparatus for storing data of a transmission signal and a computer readable storage medium.

18 Claims, 10 Drawing Sheets

(58) Field of Classification Search
CPC .................. H04L 25/0272; G11C 29/028; G06F 13/1689
See application file for complete search history.

(56) References Cited

U.S. PATENT DOCUMENTS

2009/0225901 A1    9/2009   Shimamura et al.
2016/0112183 A1*   4/2016   Drop ............... G11C 29/023
                                               375/371

FOREIGN PATENT DOCUMENTS

| CN | 101753288 A | 6/2010 |
| CN | 102081122 A | 6/2011 |
| CN | 102332975 A | 1/2012 |
| CN | 102655450 A | 9/2012 |
| CN | 104039075 A | 9/2014 |
| CN | 105264814 A | 1/2016 |
| CN | 105282070 A | 1/2016 |
| CN | 105979179 A | 9/2016 |
| CN | 106443203 A | 2/2017 |

\* cited by examiner

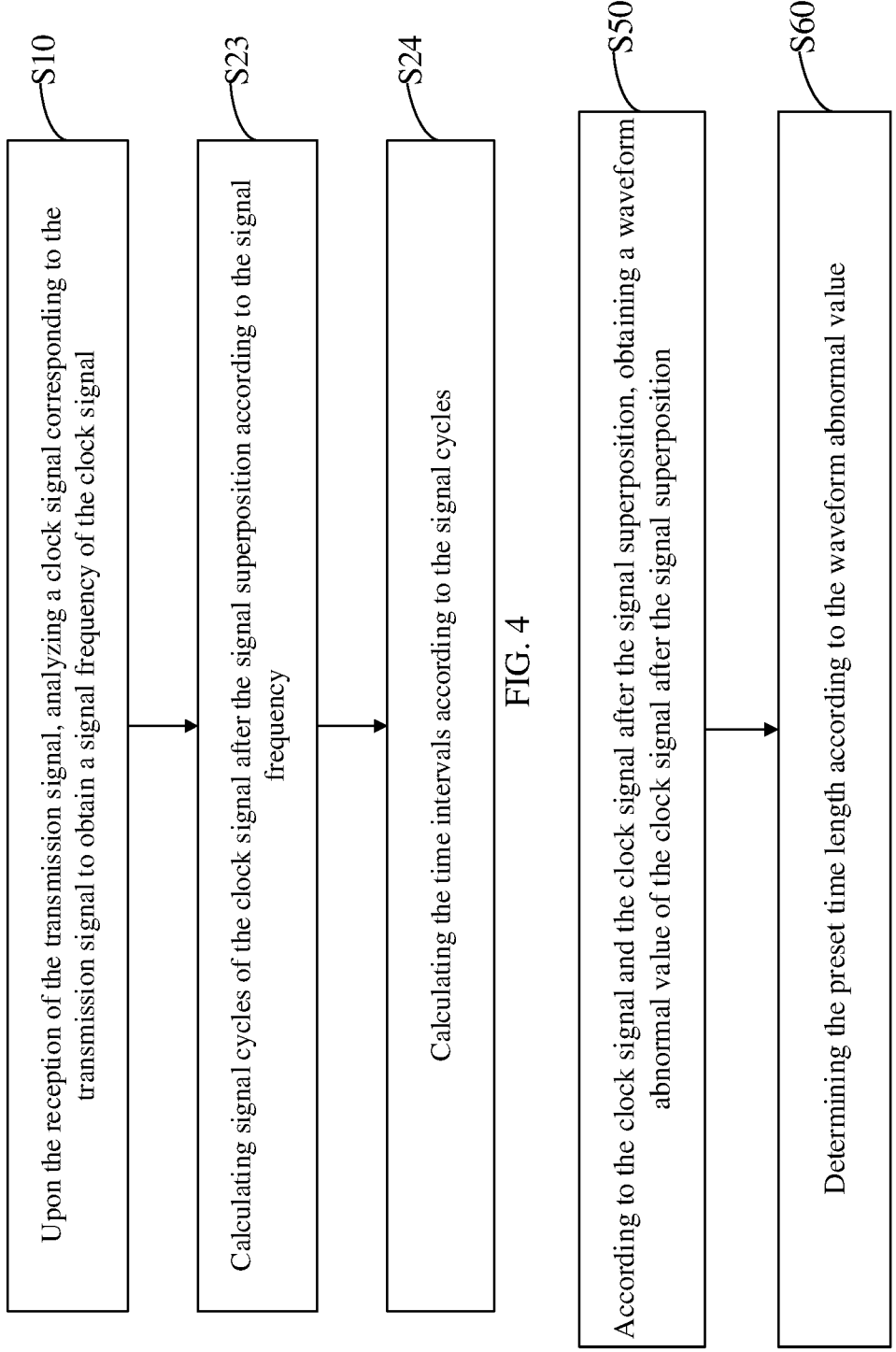

METHOD AND APPARATUS FOR STORING DATA OF TRANSMISSION SIGNAL, AND COMPUTER READABLE STORAGE MEDIUM

CROSS-REFERENCE OF RELATED APPLICATIONS

The present application is a continuation application of International Application with No. PCT/CN2018/116932, filed on Nov. 22, 2018, which claims the benefit of a Chinese Patent Application with No. 201811171298.7, titled "METHOD AND APPARATUS FOR STORING DATA OF TRANSMISSION SIGNAL AND STORAGE MEDIUM", filed in the National Intellectual Property Administration, PRC on Oct. 8, 2018, the entire contents of which are hereby incorporated by reference.

FIELD OF THE DISCLOSURE

The present application relates to the technical field of communication, and in particular, to a method and an apparatus for storing data of a transmission signal, and a computer readable storage medium.

BACKGROUND OF THE DISCLOSURE

In the technical field of communication, generally, according to a clock signal corresponding to a received transmission signal, relevant data of the transmission signal are stored. However, in an actual condition, due to inconsistency of characteristic impedances of transmission lines, a reflection phenomenon is encountered by a signal in a transmission process and then a reflected signal is superimposed with an initial signal. In this sense, a waveform of the actual clock signal has a concave-convex phenomenon. At this moment, if the relevant data of the transmission signal are still stored according to this clock signal, wrong data may be stored.

SUMMARY OF THE DISCLOSURE

A main object of the present application is to provide a method and an apparatus for storing data of a transmission signal, and a computer readable storage medium to improve the accuracy of data extraction of the transmission signal by storing the data of the transmission signal in data storage time periods.

Upon the reception of the transmission signal, a clock signal corresponding to the transmission signal is analyzed to obtain a signal frequency of the clock signal.

According to the signal frequency, zero-volt time points of a clock signal after signal superposition with the transmission signal are acquired.

A preset time length is acquired, and according to the zero-volt time points and the preset time length, data storage time periods with each of the zero-volt time points as a central time point are generated.

The data of the transmission signal are stored within each of the data storage time periods.

Optionally, the step that according to the signal frequency, zero-volt time points of a clock signal after signal superposition with the transmission signal are acquired includes:

time intervals between adjacent two zero-volt time points are calculated according to the signal frequency; and the zero-volt time points are acquired according to the time intervals.

Optionally, before the step that a preset time length is acquired, and according to the zero-volt time points and the preset time length, data storage time periods with each of the zero-volt time points as a central time point are generated, the method further includes:

according to the clock signal and the clock signal after the signal superposition, a waveform abnormal value of the clock signal after the signal superposition is obtained; and the preset time length is determined according to the waveform abnormal value.

In order to achieve the above objective, the present application further provides an apparatus for storing data of a transmission signal, which includes:

a memory; a processor; and a data storage program of the transmission signal stored on the memory and executable by the processor; and the data storage program of the transmission signal, when being executed by the processor, implements the above-mentioned steps of the method for storing the data of the transmission signal.

In order to achieve the above objective, the present application further provides a computer readable storage medium; the computer readable storage medium stores a data storage program of a transmission signal; and the data storage program of the transmission signal, when being executed, implements the above-mentioned steps of the method for storing the data of the transmission signal.

According to the method for storing the data of the transmission signal, the apparatus for storing the data of the transmission signal and the computer readable storage medium provided by the present application, upon the reception of the transmission signal, the clock signal corresponding to the transmission signal is analyzed to obtain the signal frequency of the clock signal; according to the signal frequency, the zero-volt time points of the clock signal after the signal superposition with the transmission signal are acquired; the preset time length is acquired, and according to the zero-volt time points and the preset time length, the data storage time periods with each of the zero-volt time points as the central time point are generated; and the data of the transmission signal are stored within each of the data storage time periods. In this way, by storing the data of the transmission signal in a data storage time period of which the signal waveform is stable, the accuracy of the data extraction of the transmission signal is improved.

BRIEF DESCRIPTION OF THE DRAWINGS

FIG. 4 is a flowchart schematic diagram of a still another embodiment of a method for storing data of a transmission signal of the present application;

FIG. 5 is a flowchart schematic diagram of a still another embodiment of a method for storing data of a transmission signal of the present application;

The objective implementation, functional characteristics and advantages of the present application will be further described in combination with embodiments and with reference to accompanying drawings.

DETAILED DESCRIPTION OF THE EMBODIMENTS

It should be understood that the specific embodiments described herein are merely for explaining the present application and are not intended to limit the present application.

The present application provides a method for storing data of a transmission signal to solve the problem of inaccurate data extraction of the transmission signal, and to improve the accuracy of data extraction of the transmission signal by storing the data of the transmission signal in data storage time periods.

Figure 1:
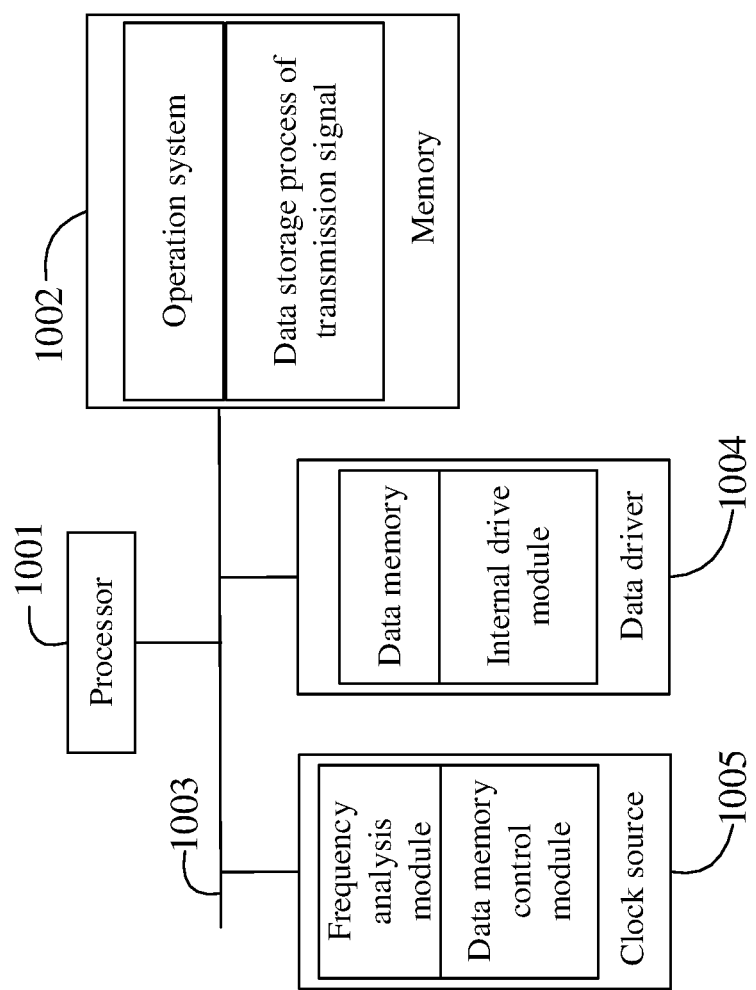
FIG. 1 is a schematic diagram of a hardware operation environment of a terminal in an embodiment related by an exemplary solution of the present application.

See FIG. 1, which is a schematic diagram of a hardware operation environment of a terminal in an embodiment related by an exemplary solution of the present application.

The terminal in this embodiment of the present application may be an apparatus for extracting data of a transmission signal, and may also be a television.

As shown in FIG. 1, the terminal may include: a processor 1001 such as a Central Processing Unit (CPU), a memory 1002, a communication bus 1003, a data driver 1004 and a clock source 1005. The communication bus 1003 is configured to implement communication connection of each of constituent parts in the terminal. The memory 1002 can be a high-speed RAM memory, and can also be a non-volatile memory, such as a magnetic disk memory. The memory 1002, alternatively, can also be a storage apparatus independent from the processor 1001. The data driver 1004 performs processing of the transmission signal, and may include at least one of a data memory or an internal processing circuit. Except for generating a clock signal, the time source 1005 may further include at least one of a frequency analysis circuit or a data memory control circuit.

It may be understood by a person skilled in the art that the structure of the terminal shown in FIG. 1 does not form a limit to the terminal in this embodiment of the present application, and may include parts more or less than those shown in the figure, or a combination of some parts, or different part arrangements.

As shown in FIG. 1, the memory 1002 as a computer storage medium may include a data storage program of the transmission signal.

In the terminal as shown in FIG. 1, the processor 1001 may be configured to invoke the data storage program of the transmission signal stored in the memory 1002, and execute the following operations:

upon the reception of the transmission signal, a clock signal corresponding to the transmission signal is analyzed to obtain a signal frequency of the clock signal;

according to the signal frequency, zero-volt time points of a clock signal after signal superposition with the transmission signal are acquired;

a preset time length is acquired, and according to the zero-volt time points and the preset time length, data storage time periods with each of the zero-volt time points as a central time point are generated; and the data of the transmission signal is stored within each of the data storage time periods.

Further, the processor 1001 may invoke the data storage program of the transmission signal stored in the memory 1002, and further executes the following operations:

time intervals between adjacent two zero-volt time points are calculated according to the signal frequency; and the zero-volt time points are acquired according to the time intervals.

Further, the processor 1001 may invoke the data storage program of the transmission signal stored in the memory 1002, and further executes the following operations:

signal cycles of the clock signal after the signal superposition are calculated according to the signal frequency; and the time intervals are calculated according to the signal cycles.

Further, the processor 1001 may invoke the data storage program of the transmission signal stored in the memory 1002, and further executes the following operations:

according to the clock signal and the clock signal after the signal superposition, a waveform abnormal value of the clock signal after the signal superposition is obtained; and the preset time length is determined according to the waveform abnormal value.

Further, the processor 1001 may invoke the data storage program of the transmission signal stored in the memory 1002, and further executes the following operations:

the zero-volt time points of the clock signal are acquired to take as first time points;

all of the zero-volt time points of the clock signal after the signal superposition are acquired to take as second time points; and according to the first time points and the second time points, the waveform abnormal value of the clock signal after the signal superposition is acquired.

Further, the processor 1001 may invoke the data storage program of the transmission signal stored in the memory 1002, and further executes the following operations:

rising edges or falling edges of the clock signal after the signal superposition are determined according to the zero-volt time points;

a preset time length is acquired, and according to the preset time length and the rising edges, or the preset time length and the falling edges, data storage time periods with each of the rising edges or the falling edges as a start time point are generated; and the data of the transmission signal are stored within each of the data storage time periods.

Further, the processor 1001 may invoke the data storage program of the transmission signal stored in the memory 1002, and further executes the following operations:

when the clock signal after the signal superposition is located at each of the rising edges or the falling edges, time points, corresponding to the rising edges or the falling edges, of the transmission signal are acquired; and the data of the transmission signal are extracted according to the time points.

Further, the processor 1001 may invoke the data storage program of the transmission signal stored in the memory 1002, and further executes the following operations:

within each of the data storage time periods, a data memory is controlled to start a data storing function to store the data of the transmission signal.

Figure 2:
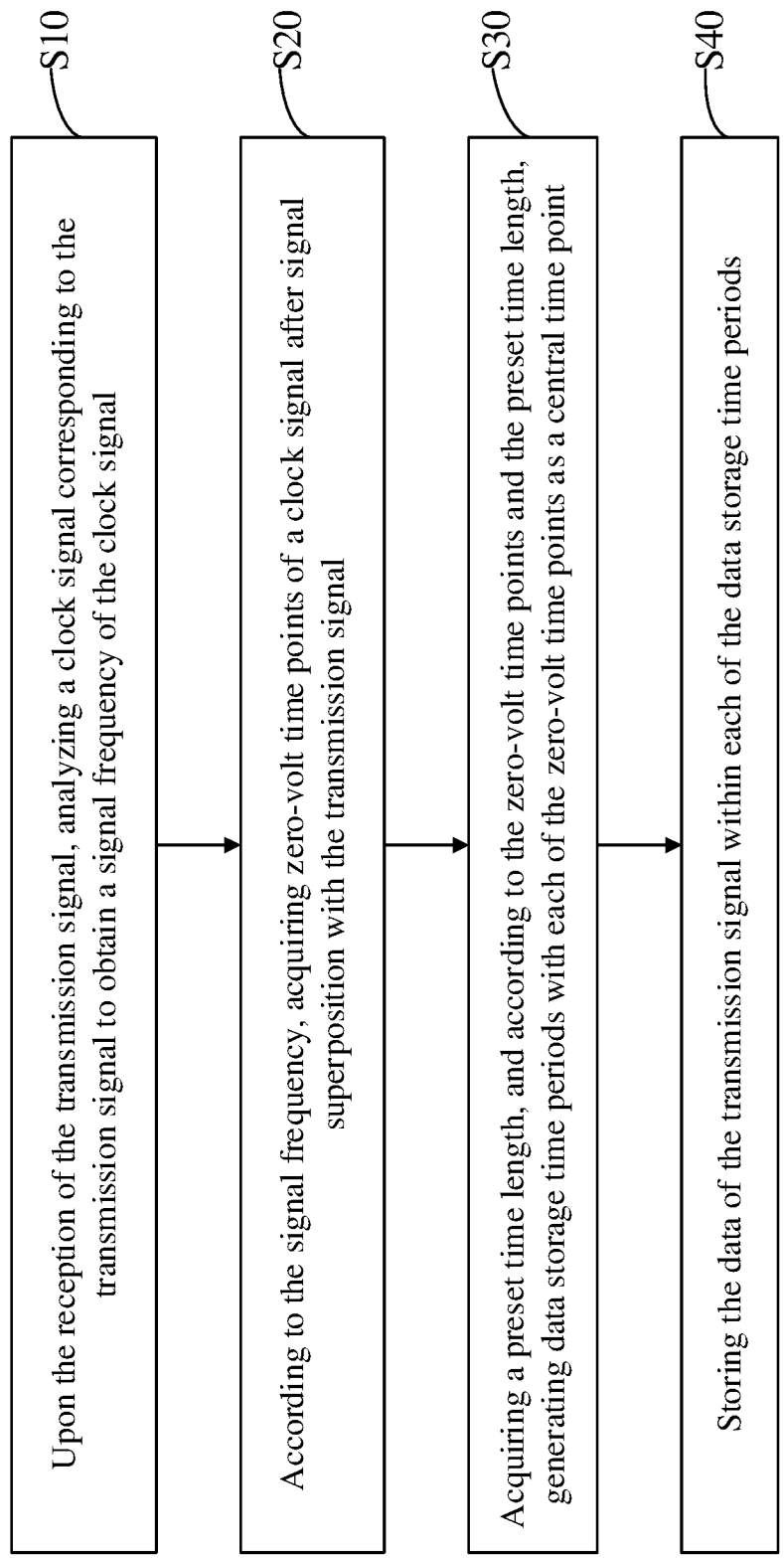
FIG. 2 is a flowchart schematic diagram of an embodiment of a method for storing data of a transmission signal of the present application.

Referring to FIG. 2, in one embodiment, a method for storing data of a transmission signal includes the following steps.

Step S10, upon the reception of the transmission signal, a clock signal corresponding to the transmission signal is analyzed to obtain a signal frequency of the clock signal.

Step S20, according to the signal frequency, zero-volt time points of a clock signal after signal superposition with the transmission signal are acquired.

Nowadays, while a communication technology gets more and more developed, there are more and more data transmitted by a transmission signal. With the technical field of a digital television as an example, along with a larger size and a higher resolution of a liquid crystal television, data in need of being transmitted are increased day by day. A differential signal is widely popular as a high-speed transmission protocol in the transmission signal. However, in a process when the transmission signal is transmitted actually, due to inconsistency of characteristic impedances of transmission lines, a reflection phenomenon is encountered by the transmission signal during the transmission and then a reflected transmission signal is superimposed with an initial clock signal. In this sense, a waveform of the obtained actual clock signal has a concave-convex phenomenon. At this moment, if data of the transmission signal are extracted directly according to the clock signal after signal superposition, wrong data may be extracted.

Figure 10:
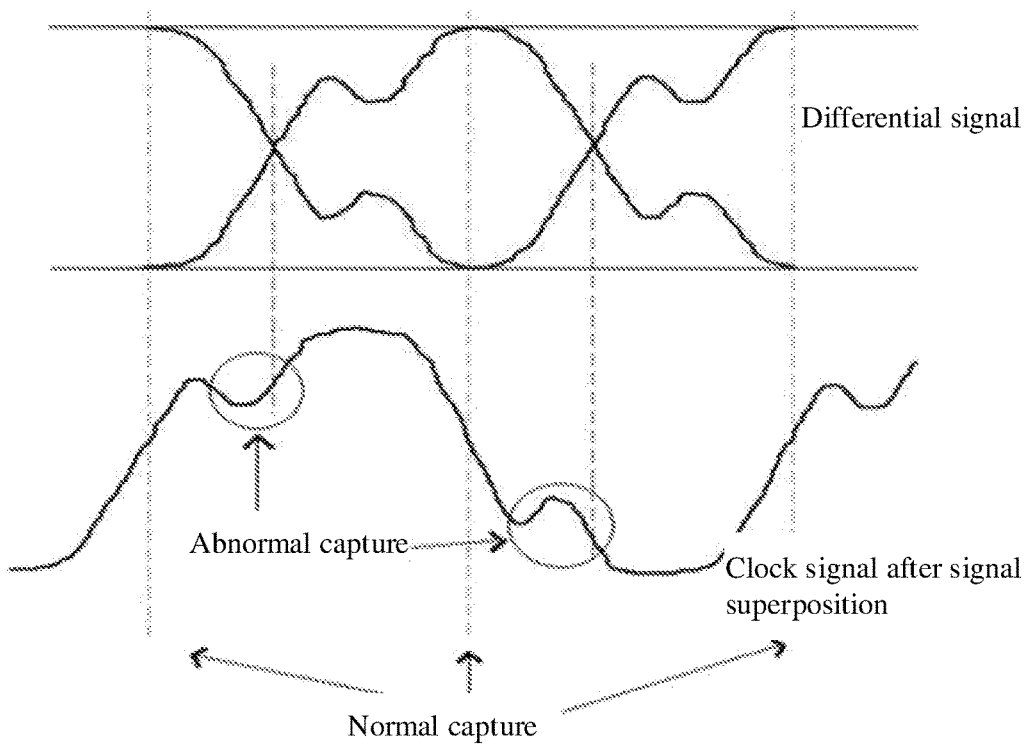
FIG. 10 is an example diagram of abnormal data extraction of a method for storing data of a transmission signal of the present application.

Referring to FIG. 10, with the differential signal as the transmission signal for example, as the waveform of the clock signal changes due to the reflection of the differential signal, for a clock signal obtained after the reflected differential signal is superimposed with the initial clock signal sent out by a clock source, the waveform of a time signal after the signal superposition may be deformed. At this moment, if data of the differential signal are extracted according to rising edges or falling edges of the time signal after signal superposition, when the waveform of the first clock signal is excessively concave or convex due to signal reflection, it is possible that the judgment of a receiving terminal on the rising edges or the falling edges of the clock signal is wrong, the data extraction of the differential signal is performed at the wrong rising edges or falling edges and the receiving terminal may receive wrong data. As a result, the problem of inaccurate data extraction of the transmission signal is occurred, and the abnormal data display or a noisy point is caused.

In order to solve the problem of inaccurate data extraction of the transmission signal, the solutions of the present application are to analyze the initial clock signal sent out by the clock source to obtain the signal frequency of the initial clock signal, then obtain the zero-volt time points of the clock signal after the signal superposition according to the signal frequency, and generate the data storage time periods with each of the zero-volt time points as the central time point. In this way, it may be ensured that rising edges or falling edges of the clock signal after the signal superposition may be included in each of the data storage time periods. The data of the transmission signal are stored within each of the data storage time periods, so that the accurate data extraction of the transmission signal may be guaranteed.

It is to be noted that a rising edge in a digital circuit is a moment when a level of a digital signal is jumped from a low level to a high level and a falling edge is a moment when the level of the digital signal is jumped from the high level to the low level. Therefore, within each of the data storage time periods, the effect that the rising edges or the falling edges of the clock signal after the signal superposition are included is implemented.

Figure 11:
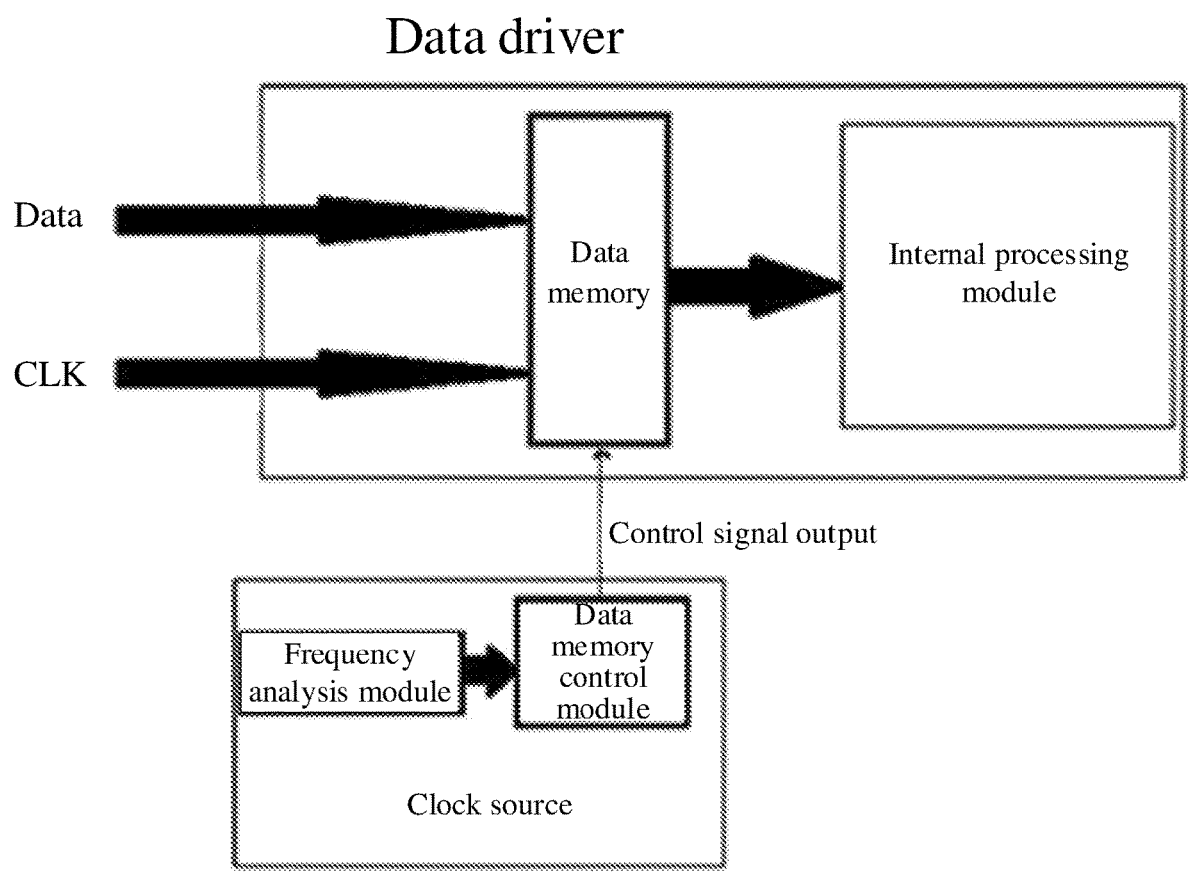
FIG. 11 is a control example diagram of a data memory of a method for storing data of a transmission signal of the present application.

Specifically, referring to FIG. 11, the clock source is provided with a frequency analysis circuit. Upon the reception of the transmission signal, the frequency analysis circuit analyzes an initial clock signal sent out by the clock source to obtain a signal frequency of the initial clock signal. After data storage time periods are generated, an enable signal is output by a data memory control circuit disposed at the clock source so as to control a data memory in a data driver to start or close a signal data storing function. According to each of the data storage periods, the signal data storing function of the data memory is started within each of the data storage periods to store the data of the transmission signal. After the data of the transmission are stored completely, signal data stored by the data memory are processed by an internal processing circuit of the data driver.

It is to be noted that the signal data storing function of the data memory may be started when the enable signal output by the data memory control circuit is at a high level, and the signal data storing function of the data memory may be closed when the enable signal output by the data memory control circuit is at a low level.

Specifically, since the clock signal corresponding to the transmission signal is generated by the clock source, the signal frequency of the clock signal obtained by analysis of the frequency analysis circuit disposed at the clock source may also be taken as a frequency of the clock signal after the signal superposition with the transmission signal. The step that according to the signal frequency, zero-volt time points of a clock signal after signal superposition with the transmission signal are acquired may be that time intervals between adjacent two zero-volt time points are calculated according to the signal frequency, and then the zero-volt time points are acquired according to the time intervals.

It is to be noted that each of the time intervals between the adjacent two zero-volt time points is equal to a half of a clock cycle, so that the signal cycles of the clock signal after the signal superposition may be calculated according to the signal frequency by using a reciprocal relationship between the signal cycles and the signal frequency, and then the time intervals may be calculated according to the signal cycles.

Specifically, for every one time interval, one time point of the clock signal after the signal superposition is obtained to take as the zero-volt time point. In this way, it is avoidable to obtain a zero-volt time point generated because of the waveform change.

Step S30, a preset time length is acquired, and according to the zero-volt time points and the preset time length, data storage time periods with each of the zero-volt time points as a central time point are generated.

Step S40, the data of the transmission signal is stored within each of the data storage time periods.

Figure 12:
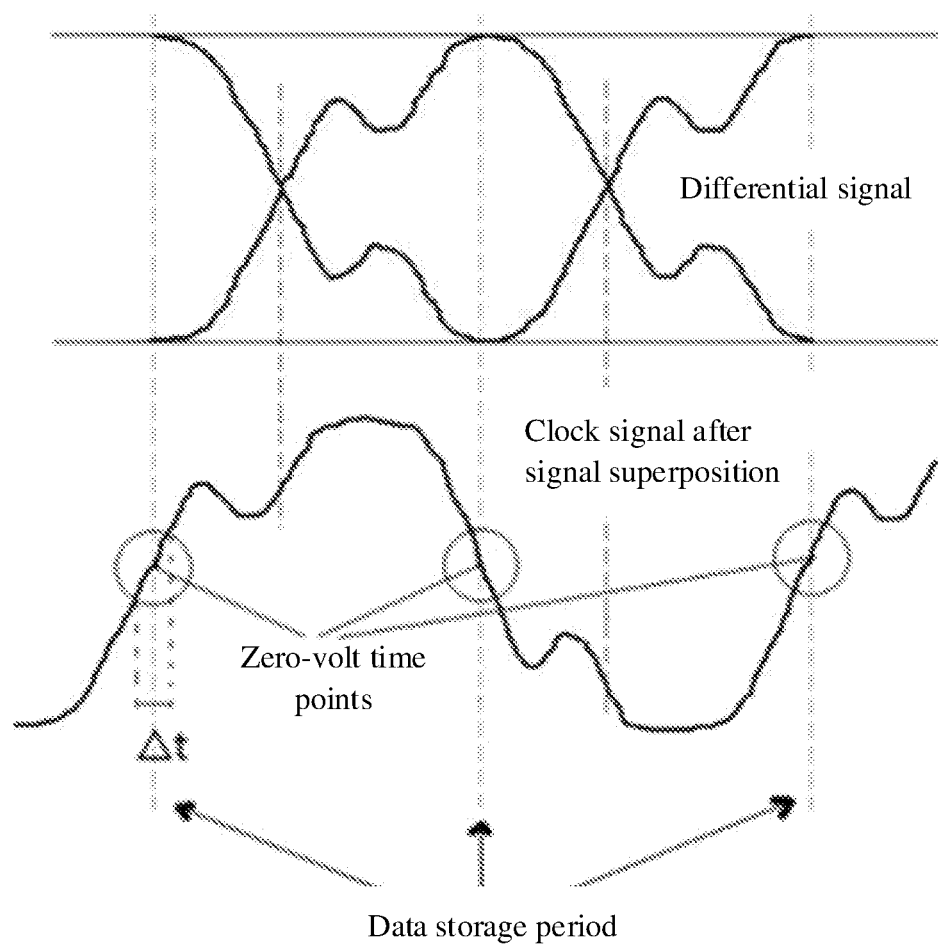
FIG. 12 is an example diagram of a data storage time period of a method for storing data of a transmission signal of the present application.

In this embodiment, since the rising edge in the digital circuit is the moment when the level of the digital signal is jumped from the low level to the high level, and the falling edge is the moment when the level of the digital signal is jumped from the high level to the low level, referring to FIG. 12, the zero-volt time points of the clock signal after the signal superposition are acquired, then the preset time length is acquired, and according to the zero-volt time points and the preset time length, the data storage time periods with each of the zero-volt time points as the central time point are generated. Therefore, each of the data storage time periods may include the rising edge and/or the falling edge of the first clock signal. Then, the data of the transmission signal are stored according to each of the data storage time periods, so that the accuracy of the data extraction of the transmission signal may be improved.

Before the step that a preset time length is acquired, and according to the zero-volt time points and the preset time length, data storage time periods with each of the zero-volt time points as a central time point are generated, the method further includes: according to the clock signal and the clock signal after the signal superposition, a waveform abnormal value of the clock signal after the signal superposition is obtained; and the preset time length is determined according to the waveform abnormal value. Specifically, the zero-volt time points of the clock signal are acquired to take as first time points; all of the zero-volt time points of the clock signal after the signal superposition are acquired to take as second time points; and according to the first time points and the second time points, the waveform abnormal value of the clock signal after the signal superposition is obtained.

It is to be noted that due to the change of the waveform of the clock signal after the signal superposition, a number of the zero-volt time points of the clock signal after the signal superposition may be greater than a number of the zero-volt time points of the clock signal of which the waveform is not changed under an ideal state. Therefore, the waveform abnormal value may be obtained according to a difference between the number of the first time points and the number of the second time points. The preset time length may be in inversely proportional relationship with the waveform abnormal value. In this sense, the preset time length may be obtained by calculating a reciprocal of the waveform abnormal value. According to an actual condition, in order to prevent from obtaining unnecessary data of the transmission signal, a maximum value of the preset time length may further be set as one eighth of an interval time length of each of the time intervals.

After the data storage time periods are generated, a data memory is started within each of the data storage time periods and the data of the transmission signal are stored within each of the data storage time periods, so that the extraction on the data of the transmission signal is implemented. It is to be noted that it may be appropriate to start a signal data storing function of the data memory by controlling an output enable signal of a data memory control circuit at the high level at a start time of each of the data storage time periods, and close the signal data storing function of the data memory by controlling the output enable signal of the data memory control circuit at the low level at an end time of each of the data storage time periods. For a time out of each of the data storage time periods, the storage of the data of the transmission signal is not performed.

In one embodiment, upon the reception of the transmission signal, the clock signal corresponding to the transmission signal is analyzed to obtain the signal frequency of the clock signal; according to the signal frequency, the zero-volt time points of the clock signal after the signal superposition with the transmission signal are acquired; the preset time length is acquired, and according to the zero-volt time points and the preset time length, the data storage time periods with each of the zero-volt time points as the central time point are generated; and the data of the transmission signal are stored within each of the data storage time periods. In this way, by generating the data storage time periods with each of the zero-volt time points as the central time point, it is ensured that each of the data storage time periods can include the rising edges or the falling edges of the clock signal after the signal superposition; and by storing the data of the transmission signal within each of the data storage time periods, the accuracy of the data extraction of the transmission signal is improved.

Figure 3:
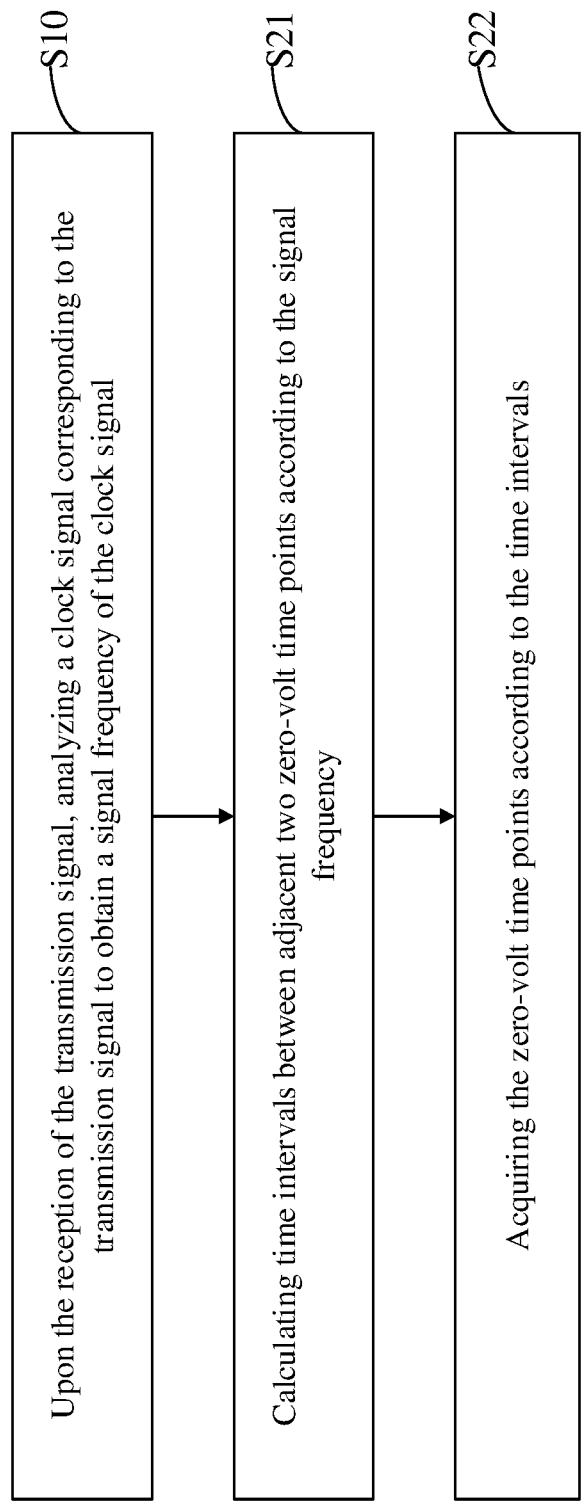
FIG. 3 is a flowchart schematic diagram of another embodiment of a method for storing data of a transmission signal of the present application.

In one embodiment, as shown in FIG. 3, on the basis of the embodiment shown in FIG. 2, the step that according to the signal frequency, zero-volt time points of a clock signal after signal superposition with the transmission signal are acquired includes the following steps.

Step S21, time intervals between adjacent two zero-volt time points are calculated according to the signal frequency.

Step S22, the zero-volt time points are acquired according to the time intervals.

It is to be noted that each of the time intervals between the adjacent two zero-volt time points is equal to a half of a clock cycle, so that the signal cycles of the clock signal after the signal superposition may be calculated according to the signal frequency by using a reciprocal relationship between the signal cycles and the signal frequency, and then the time intervals may be calculated according to the signal cycles. It is to be noted that since the clock signal corresponding to the transmission signal is generated by the clock source, the signal frequency of the clock signal obtained by analysis of the frequency analysis circuit disposed at the clock source may also be taken as a frequency of the clock signal after the signal superposition with the transmission signal.

Specifically, for every one time interval, one time point of the clock signal after the signal superposition is obtained to take as the zero-volt time point. In this way, it is avoidable to obtain a zero-volt time point generated because of the waveform change.

In one embodiment, the time intervals between the adjacent two zero-volt time points are calculated according to the signal frequency; and the zero-volt time points are acquired according to the time intervals. In this way, the accurate acquisition of the zero-volt time points is implemented, and the zero-volt time points generated due to the waveform change are prevented from being obtained.

In one embodiment, as shown in FIG. 4, on the basis of the embodiments in FIG. 2 to FIG. 3, the step that time intervals between two zero-volt time points are calculated according to the signal frequency includes the following steps.

Step S23, signal cycles of the clock signal after the signal superposition are calculated according to the signal frequency.

Step S24, the time intervals are calculated according to the signal cycles.

In this embodiment, the signal cycles of the clock signal after the signal superposition may be calculated via the signal frequency according to a reciprocal relationship between the signal cycles and the signal frequency. Since each of the time intervals between the adjacent two zero-volt time points is equal to a half of each of the signal cycle, the time intervals may be calculated according to the signal cycles.

In one embodiment, the signal cycles of the clock signal after the signal superposition are calculated according to the signal frequency; and the time intervals are calculated according to the signal cycles. Therefore, the effect that the time intervals between the two adjacent zero-volt time points are calculated is implemented.

In one embodiment, as shown in FIG. 5, on the basis of the embodiments in FIG. 2 to FIG. 4, before the step that a preset time length is acquired, and according to the zero-volt time points and the preset time length, data storage time periods with each of the zero-volt time points as a central time point are generated, the method further includes the following steps.

Step S50, according to the clock signal and the clock signal after the signal superposition, a waveform abnormal value of the clock signal after the signal superposition is obtained.

Step S60, the preset time length is determined according to the waveform abnormal value.

In this embodiment, before the step that a preset time length is acquired, and according to the zero-volt time points and the preset time length, data storage time periods with each of the zero-volt time points as a central time point are generated, the method further includes the steps that according to the clock signal and the clock signal after the signal superposition, the waveform abnormal value of the clock signal after the signal superposition is obtained; and the preset time length is determined according to the waveform abnormal value. Specifically, the zero-volt time points of the clock signal are acquired to take as first time points; all of the zero-volt time points of the clock signal after the signal superposition are acquired to take as second time points; and according to the first time points and the second time points, the waveform abnormal value of the clock signal after the signal superposition is obtained.

It is to be noted that due to the change of the waveform of the clock signal after the signal superposition, a number of the zero-volt time points of the clock signal after the signal superposition may be greater than a number of the zero-volt time points of the clock signal of which the waveform is not changed under an ideal state. Therefore, the waveform abnormal value may be obtained according to a difference between the number of the first time points and the number of the second time points. The preset time length may be in inversely proportional relationship with the waveform abnormal value. In this sense, the preset time length may be obtained by calculating a reciprocal of the waveform abnormal value.

In this way, when the preset time length is determined via the waveform abnormal value, it may be appropriate that the larger the waveform abnormal value, the smaller the determined preset time length. Moreover, according to an actual condition, in order to prevent from obtaining unnecessary data of the transmission signal, a maximum value of the preset time length may further be set as one eighth of an interval time length of each of the time intervals between two zero-volt time points.

In one embodiment, according to the clock signal and the clock signal after the signal superposition, the waveform abnormal value of the clock signal after the signal superposition is obtained; and the preset time length is determined according to the waveform abnormal value. In this way, by determining the preset time length according to the waveform abnormal value, and correspondingly, by setting that the larger the waveform abnormal value, the smaller the determined preset time length, it is ensured that the data of the transmission signal can be stored in a time period of which the waveform is stable.

Figure 6:
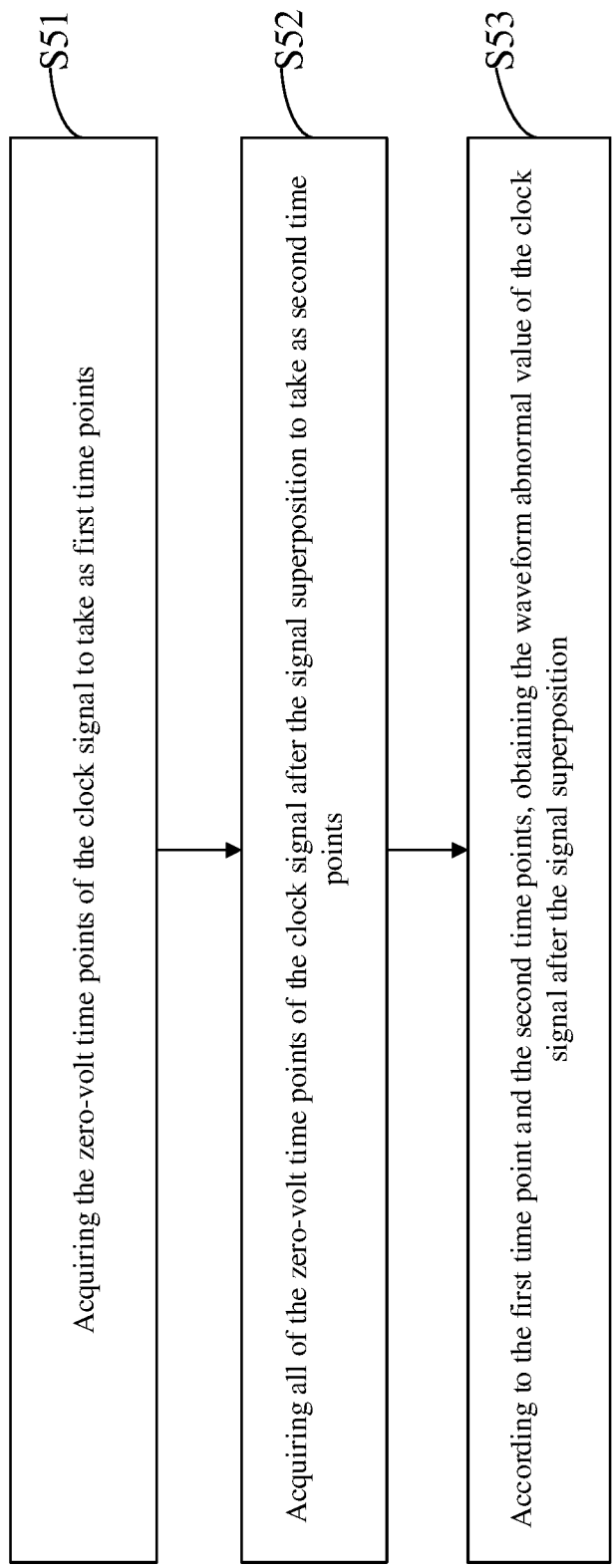
FIG. 6 is a flowchart schematic diagram of a still another embodiment of a method for storing data of a transmission signal of the present application.

In one embodiment, as shown in FIG. 6, on the basis of the embodiments in FIG. 2 to FIG. 5, the step that according to the clock signal and the clock signal after the signal superposition, a waveform abnormal value of the clock signal after the signal superposition is obtained includes the following steps.

Step S51, the zero-volt time points of the clock signal are acquired to take as first time points.

Step S52, all of the zero-volt time points of the clock signal after the signal superposition are acquired to take as second time points.

Step S53, according to the first time points and the second time points, the waveform abnormal value of the clock signal after the signal superposition is obtained.

In this embodiment, due to the change of the waveform of the clock signal after the signal superposition, a number of the zero-volt time points of the clock signal after the signal superposition may be greater than a number of the zero-volt time points of the clock signal of which the waveform is not changed under an ideal state. Therefore, the waveform abnormal value may be obtained according to a difference between the number of the first time points and the number of the second time points. The preset time length may be in inversely proportional relationship with the waveform abnormal value. In this sense, the preset time length may be obtained by calculating a reciprocal of the waveform abnormal value.

In one embodiment, the zero-volt time points of the clock signal are acquired to take as the first time points; all of the zero-volt time points of the clock signal after the signal superposition are acquired to take as the second time points; and according to the first time points and the second time points, the waveform abnormal value of the clock signal after the signal superposition is obtained. In this way, the acquisition of the waveform abnormal value is implemented; and correspondingly, the effect that the larger the waveform abnormal value, the smaller the determined preset time length may further be implemented.

Figure 7:
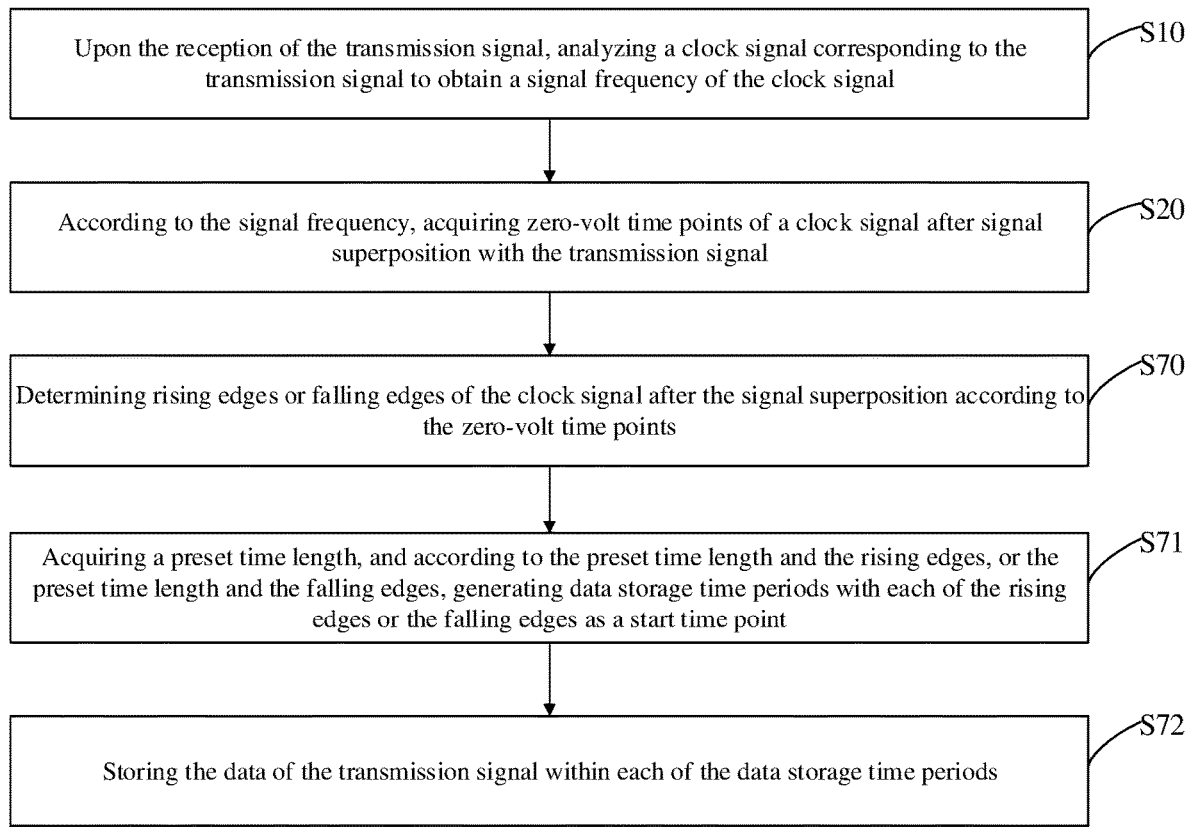
FIG. 7 is a flowchart schematic diagram of a still another embodiment of a method for storing data of a transmission signal of the present application.

In one embodiment, as shown in FIG. 7, on the basis of the embodiments in FIG. 2 to FIG. 6, after the step that according to the signal frequency, zero-volt time points of the clock signal after signal superposition with the transmission signal are acquired, the method further includes the following steps.

Step S70, rising edges or falling edges of the clock signal after the signal superposition are determined according to the zero-volt time points.

Step S71, a preset time length is acquired, and according to the preset time length and the rising edges, or the preset time length and the falling edges, data storage time periods with each of the rising edges or the falling edges as a start time point are generated.

Step S72, the data of the transmission signal are stored within each of the data storage time periods.

In this embodiment, by detecting a level jump of a signal waveform nearby each of the zero-volt time points, the rising edges or the falling edges of the clock signal after the signal superposition may be determined. The preset time length may be determined according to the waveform abnormal value, and may also be preset as 3 s, 5 s and the like. The start time point of each of the data storage periods is each of the rising edges or the falling edges, i.e., when the clock signal after the signal superposition is located at each of the rising edges or the falling edges, the data memory is started to store the data of the transmission signal; and after the preset time length, the data memory is closed.

In one embodiment, the rising edges or the falling edges of the clock signal after the signal superposition are determined according to the zero-volt time points; the preset time length is acquired, and according to the preset time length and the rising edges, or the preset time length and the falling edges, the data storage time periods with each of the rising edges or the falling edges as the start time point are generated; and the data of the transmission signal are stored within each of the data storage time periods. In this way, the accuracy of the data extraction on the transmission signal is improved.

Figure 8:
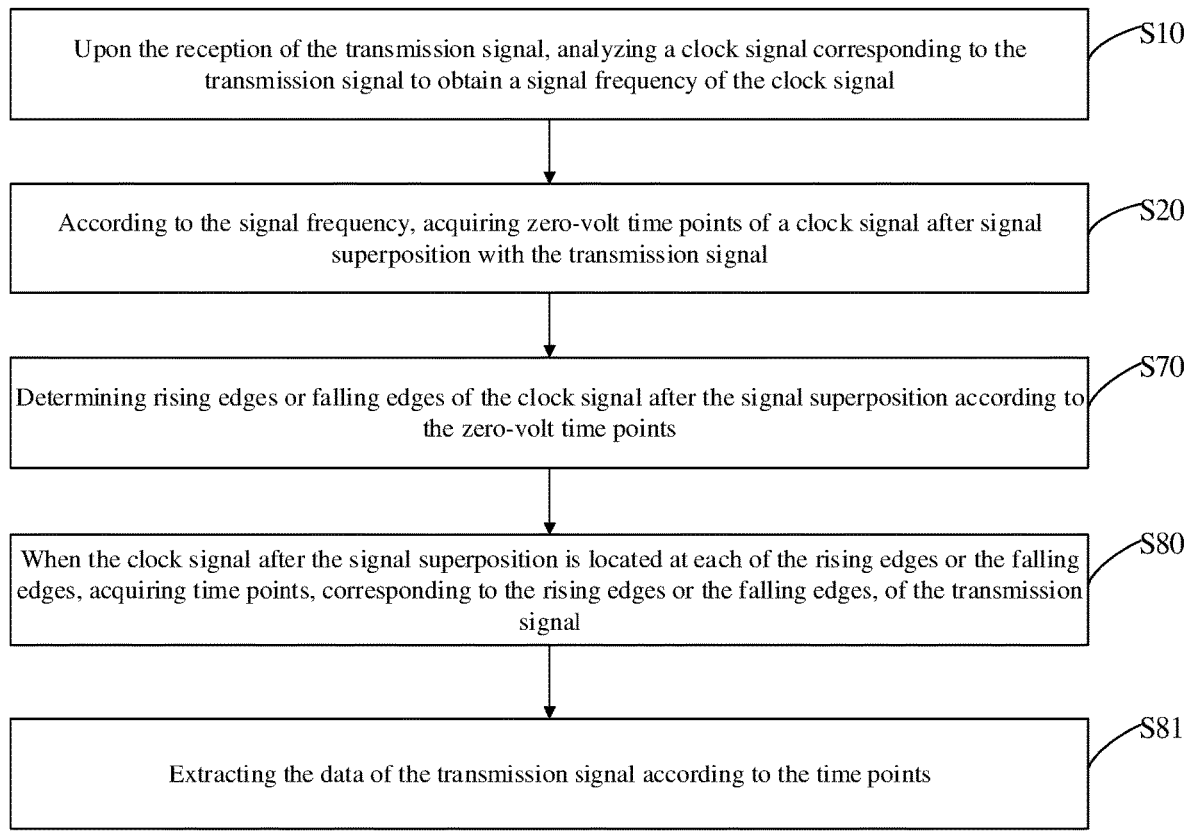
FIG. 8 is a flowchart schematic diagram of a still another embodiment of a method for storing data of a transmission signal of the present application.

In one embodiment, as shown in FIG. 8, on the basis of the embodiments in FIG. 2 to FIG. 7, after the step that according to the signal frequency, zero-volt time points of the clock signal after signal superposition with the transmission signal are acquired, the method further includes the following steps.

Step S80, when the clock signal after the signal superposition is located at each of the rising edges or the falling edges, a time point, corresponding to each of the rising edges or the falling edges, of the transmission time is acquired.

Step S81, the data of the transmission signal are extracted according to the time points.

In this embodiment, after the zero-volt time points of the clock signal after the signal superposition are acquired, when the clock signal after the signal superposition is located at each of the rising edges or the falling edges, the time point, corresponding to each of the rising edges or the falling edges, of the transmission time is acquired; and the data of the transmission signal are extracted according to the time points. In this way, the accuracy of the data extraction on the transmission signal is improved.

Figure 9:
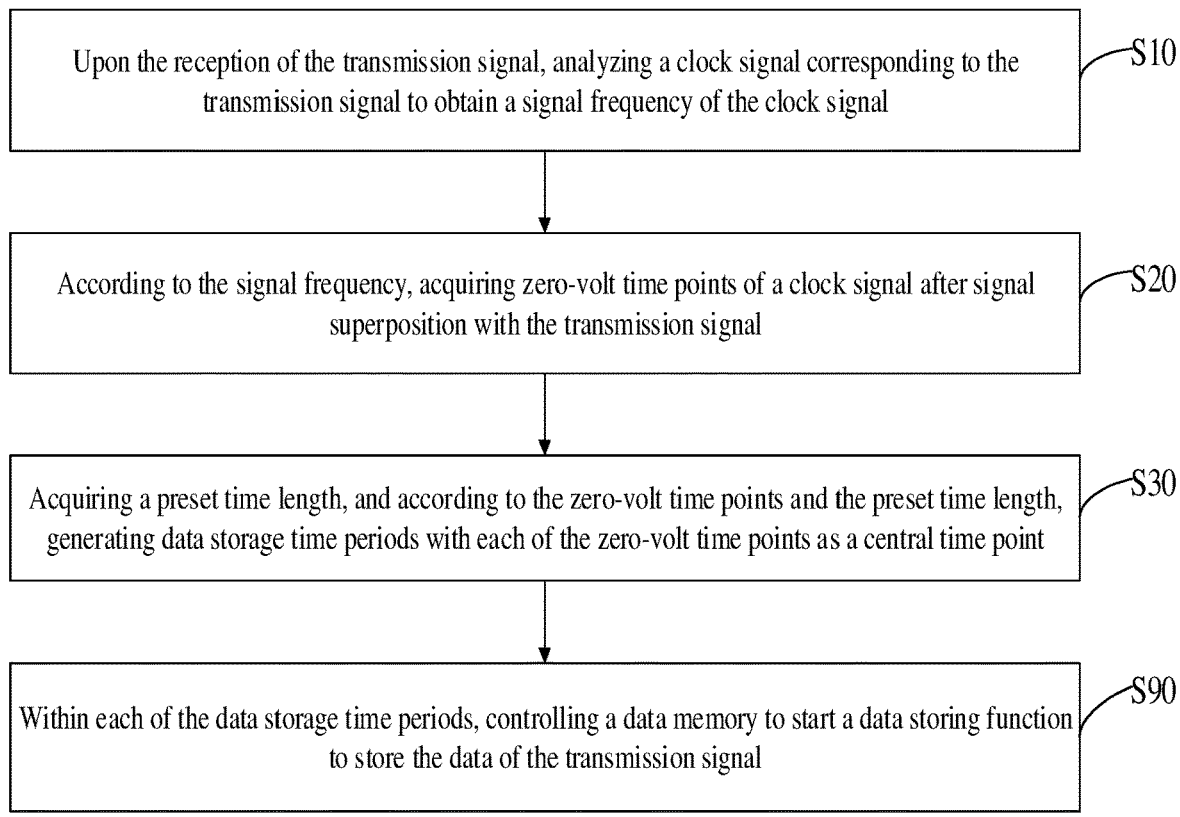
FIG. 9 is a flowchart schematic diagram of a still another embodiment of a method for storing data of a transmission signal of the present application.

In one embodiment, as shown in FIG. 9, on the basis of the embodiments in FIG. 2 to FIG. 8, the step that the data of the transmission signal are stored within each of the data storage time periods includes the following steps.

Step S90, within each of the data storage time periods, the data memory is controlled to start a data storing function to store the data of the transmission signal.

In this embodiment, after the data storage time periods are generated, the data memory is started within each of the data storage time periods; and by storing the data of the transmission signal within each of the data storage time periods, the extraction on the data of the transmission signal is implemented. It is to be noted that it may be appropriate to start a signal data storing function of the data memory by controlling an output enable signal of a data memory control circuit at the high level at a start time of each of the data storage time periods, and end the signal data storing function of the data memory by controlling the output enable signal of the data memory control circuit at the low level at an end time of each of the data storage time periods. For a time out of each of the data storage time periods, the storage of the data of the transmission signal is not performed.

In one embodiment, within each of the data storage time periods, the data memory is controlled to start the data storing function to store the data of the transmission signal. Therefore, by enabling the data memory control circuit to output the enable signal within each of the data storage time periods, the effect of controlling the data memory to store the data of the transmission signal is implemented.

In addition, the present application further discloses an apparatus for storing data of a transmission signal, which includes a memory, a processor, and a data storage program of a transmission signal stored on the memory and capable of being operated on the processor; and the processor, when executing the data storage program of the transmission signal, implements the steps of the method for storing the data of the transmission signal in the above-mentioned embodiments.

In addition, the present application further discloses a computer readable storage medium, which includes a data storage program of a transmission signal; and when the data storage program of the transmission signal, when being executed by a processor, implements the steps of the method for storing the data of the transmission signal in the above-mentioned embodiments.

Numerals of the embodiments of the present applications are merely for description and do not indicate excellence of the embodiments.

According to the description of the embodiments above, a person skilled in the art may clearly understand that the present application may be implemented by software plus a necessary hardware platform. Certainly, the present application may also be implemented by only hardware. However, the former is preferred in most circumstances. Based on such an understanding, the technical solutions of the present application substantially may be embodied in a form of a software product, and the computer software product is stored in the storage medium (such as a Read-Only Memory (ROM)/Random Access Memory (RAM), a magnetic disk and an optical disc), including a plurality of instructions configured to enable a piece of terminal equipment (which may be a television, a mobile phone, a computer, a server, an air conditioner, or network equipment, etc.) to execute the method in each embodiment of the present application.

The above are optional embodiments of the present application and are not intended to limit a scope of the present application thereto. Any transformation of an equivalent structure or an equivalent procedure made by using the specification and accompanying drawings of the present application, or direct or indirect utilization in other relevant technical fields all should be included in a scope of protection of the present application.

What is claimed is:

1. A method for storing data of a transmission signal, comprising:
   upon the reception of the transmission signal, analyzing a clock signal corresponding to the transmission signal to obtain a signal frequency of the clock signal;
   according to the signal frequency, acquiring zero-volt time points of a clock signal after signal superposition with the transmission signal;
   acquiring a preset time length, and according to the zero-volt time points and the preset time length, generating data storage time periods with each of the zero-volt time points as a central time point; and
   storing the data of the transmission signal within each of the data storage time periods.

2. The method for storing the data of the transmission signal according to claim 1, wherein the step of according to the signal frequency, acquiring zero-volt time points of a clock signal after signal superposition with the transmission signal comprises:
   calculating time intervals between two adjacent zero-volt time points according to the signal frequency; and
   acquiring the zero-volt time points according to the time intervals.

3. The method for storing the data of the transmission signal according to claim 2, wherein the step of calculating time intervals between two adjacent zero-volt time points according to the signal frequency comprises:
   calculating signal cycles of the clock signal after the signal superposition according to the signal frequency; and
   calculating the time intervals according to the signal cycles.

4. The method for storing the data of the transmission signal according to claim 1, before the step of acquiring a preset time length, and according to the zero-volt time points and the preset time length, generating data storage time periods with each of the zero-volt time points as a central time point, further comprising:
  according to the clock signal and the clock signal after the signal superposition, obtaining a waveform abnormal value of the clock signal after the signal superposition; and
  determining the preset time length according to the waveform abnormal value.

5. The method for storing the data of the transmission signal according to claim 4, wherein the step of according to the clock signal and the clock signal after the signal superposition, obtaining a waveform abnormal value of the clock signal after the signal superposition comprises:
  acquiring the zero-volt time points of the clock signal to take as first time points;
  acquiring all of the zero-volt time points of the clock signal after the signal superposition to take as second time points; and
  according to the first time points and the second time points, obtaining the waveform abnormal value of the clock signal after the signal superposition.

6. The method for storing the data of the transmission signal according to claim 5, wherein the step of according to the first time points and the second time points, obtaining the waveform abnormal value of the clock signal after the signal superposition comprises:
  calculating a difference between a number of the first time points and a number of the second time points to obtain the waveform abnormal value of the clock signal after the signal superposition.

7. The method for storing the data of the transmission signal according to claim 1, wherein the step of storing data of the transmission signal within each of the data storage time periods comprises:
  within each of the data storage time periods, controlling a data memory to start a data storing function to store the data of the transmission signal.

8. The method for storing the data of the transmission signal according to claim 1, wherein the step of storing data of the transmission signal within each of the data storage time periods comprises:
  at a start time of each of the data storage time periods, by controlling an output enable signal of a data memory at a high level, starting a signal data storing function of the data memory to store the data of the transmission signal; and
  at an end time of each of the data storage time periods, by controlling the output enable signal of the data memory at a low level, closing the signal data storing function of the data memory to stop to store the data of the transmission signal.

9. The method for storing the data of the transmission signal according to claim 1, wherein the step of analyzing a clock signal corresponding to the transmission signal to obtain a signal frequency of the clock signal comprises:
  controlling a frequency analysis circuit disposed at a clock source to analyze the clock signal corresponding to the transmission signal to obtain the signal frequency of the clock signal, wherein the clock signal is generated by the clock source.

10. The method for storing the data of the transmission signal according to claim 1, after the step of according to the signal frequency, acquiring zero-volt time points of a clock signal after signal superposition with the transmission signal, further comprising:
  determining rising edges or falling edges of the clock signal after the signal superposition according to the zero-volt time points;
  acquiring the preset time length, and according to the preset time length and the rising edges, or according to the preset time length and the falling edges, generating the data storage time periods with each of the rising edges or the falling edges as a start time point; and
  storing the data of the transmission signal within each of the data storage time periods.

11. The method for storing the data of the transmission signal according to claim 10, the step of determining rising edges or falling edges of the clock signal after the signal superposition according to the zero-volt time points comprises:
  detecting a level jump of a signal waveform nearby each of the zero-volt time points to determine the rising edges or the falling edges of the clock signal after the signal superposition.

12. The method for storing the data of the transmission signal according to claim 10, wherein the step of storing data of the transmission signal within each of the data storage time periods comprises:
  within each of the data storage time periods, controlling a data memory to start a data storing function to store the data of the transmission signal.

13. The method for storing the data of the transmission signal according to claim 12, wherein the step of within each of the data storage time periods, controlling a data memory to start a data storing function comprises:
  at a start time of each of the data storage time periods, by controlling an output enable signal of the data memory at a high level, starting a signal data storing function of the data memory; and
  at an end time of each of the data storage time periods, by controlling the output enable signal of the data memory at a low level, closing the signal data storing function of the data memory.

14. The method for storing the data of the transmission signal according to claim 10, wherein the step of storing data of the transmission signal within each of the data storage time periods comprises:
  when the clock signal after the signal superposition is located at each of the rising edges or the falling edges, starting the data memory to store the data of the transmission signal; and
  after the preset time length, closing the data memory.

15. The method for storing the data of the transmission signal according to claim 10, after the step of determining rising edges or falling edges of the clock signal after the signal superposition according to the zero-volt time points, further comprising:
  when the clock signal after the signal superposition is located at each of the rising edges or the falling edges, acquiring time points, corresponding to the rising edges or the falling edges, of the transmission signal; and
  extracting the data of the transmission signal according to the time points.

16. The method for storing the data of the transmission signal according to claim 1, further comprising:
  upon the reception of a differential signal, analyzing a clock signal corresponding to the differential signal to obtain a signal frequency of the clock signal;

according to the signal frequency, acquiring zero-volt time points of a clock signal after signal superposition with the differential signal;

acquiring a preset time length, and according to the zero-volt time points and the preset time length, generating data storage time periods with each of the zero-volt time points as a central time point; and storing data of the differential signal with each of the data storage time periods.

17. An apparatus for storing data of a transmission signal, comprising a memory; a processor; and a data storage program of the transmission signal, stored on the memory and executable by the processor; and the data storage program of the transmission signal, when being executed by the processor, causing the processor to implement the following steps of a method for storing the data of the transmission signal:

upon the reception of the transmission signal, analyzing a clock signal corresponding to the transmission signal to obtain a signal frequency of the clock signal;

according to the signal frequency, acquiring zero-volt time points of a clock signal after signal superposition with the transmission signal;

acquiring a preset time length, and according to the zero-volt time points and the preset time length, generating data storage time periods with each of the zero-volt time points as a central time point; and storing the data of the transmission signal within each of the data storage time periods.

18. A non-transitory computer readable storage medium, the non-transitory computer readable storage medium storing a data storage program of a transmission signal, and the data storage program of the transmission signal, when being executed by a processor, causing the processor to implement the following steps of a method for storing the data of the transmission signal:

upon the reception of the transmission signal, analyzing a clock signal corresponding to the transmission signal to obtain a signal frequency of the clock signal;

according to the signal frequency, acquiring zero-volt time points of a clock signal after signal superposition with the transmission signal;

acquiring a preset time length, and according to the zero-volt time points and the preset time length, generating data storage time periods with each of the zero-volt time points as a central time point; and storing the data of the transmission signal within each of the data storage time periods.

* * * * *